US012811824B2

(12) United States Patent
Müller

(10) Patent No.: US 12,811,824 B2
(45) Date of Patent: Nov. 24, 2026

(54) SPE-BASED DEVICE ADAPTER FOR CONNECTING A NON-ETHERNET-COMPATIBLE FIELD DEVICE TO AN ETHERNET-BASED PROCESS CONTROL SYSTEM

(71) Applicant: Phoenix Contact GmbH & Co. KG, Blomberg (DE)

(72) Inventor: Martin Müller, Lügde (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 300 days.

(21) Appl. No.: 17/795,931

(22) PCT Filed: Jan. 28, 2021

(86) PCT No.: PCT/EP2021/051979
§ 371 (c)(1),
(2) Date: Jul. 28, 2022

(87) PCT Pub. No.: WO2021/152010
PCT Pub. Date: Aug. 5, 2021

(65) Prior Publication Data

US 2023/0123088 A1 Apr. 20, 2023

(30) Foreign Application Priority Data

Jan. 30, 2020 (LU) ........................................ 101627

(51) Int. Cl.
*H04L 12/46* (2006.01)
*H04L 12/66* (2006.01)

(52) U.S. Cl.
CPC .......... *H04L 12/4625* (2013.01); *H04L 12/66* (2013.01)

(58) Field of Classification Search
CPC ............................ H04L 12/66; H04L 12/4625
See application file for complete search history.

(56) References Cited

U.S. PATENT DOCUMENTS 9,451,055 B2 * 9/2016 Lessmann ......... H04L 12/40032
2005/0228509 A1 10/2005 James (Continued)

FOREIGN PATENT DOCUMENTS

CN 101072143 A 11/2007
CN 202737903 U 2/2013

(Continued)

OTHER PUBLICATIONS

English machine translation of DE102016125169A1 provided by Espacenet. (Year: 2018).*

(Continued)

*Primary Examiner* — Ayaz R Sheikh
*Assistant Examiner* — Christopher R Davis
(74) *Attorney, Agent, or Firm* — LEYDIG, VOIT & MAYER, LTD.

(57) ABSTRACT

An SPE-based device adapter for connecting a non-Ethernet-capable field device to an Ethernet-based process control system, includes: a first SPE-based communication interface which is adapted for receiving and transmitting Ethernet data frames via a two-wire Ethernet cable; a second communication interface which is adapted for receiving and transmitting data, according to a first communication protocol from and to a non-Ethernet-capable field device, wherein the first communication protocol is not an Ethernet-based communication protocol; and a first conversion unit which is adapted for converting data received via the second communication interface into Ethernet data frames for transmission via the first SPE-based communication interface, and to convert Ethernet data frames received via the first (Continued)

SPE-based communication interface into data for transmission via the second communication interface according to the first communication protocol.

6 Claims, 2 Drawing Sheets

(56) References Cited

U.S. PATENT DOCUMENTS

| | | | |
|---|---|---|---|
| 2006/0047480 A1 | 3/2006 | Lenz et al. | |
| 2007/0019560 A1* | 1/2007 | Brewer | H04L 12/10 709/224 |
| 2011/0302481 A1 | 12/2011 | Calvignac et al. | |
| 2019/0068407 A1 | 2/2019 | Haga et al. | |
| 2021/0144877 A1* | 5/2021 | Lessmann | G05B 19/042 |

FOREIGN PATENT DOCUMENTS

| | | | |
|---|---|---|---|
| CN | 106254518 | A | 12/2016 |
| CN | 106961437 | A | 7/2017 |
| CN | 108156062 | A | 6/2018 |
| DE | 102006036770 | A1 | 2/2008 |
| DE | 102008019053 | A1 | 10/2009 |
| DE | 102011107322 | A1 | 1/2013 |
| DE | 102015200333 | A1 | 1/2016 |
| DE | 102016125169 | A1 | 6/2018 |
| DE | 102017212487 | B4 | 2/2019 |
| DE | 102019110592 | A1 | 10/2020 |
| EP | 1349024 | A2 | 10/2003 |
| EP | 2683121 | A1 | 1/2014 |
| EP | 2784977 | A1 | 10/2014 |
| EP | 3468106 | A1 | 4/2019 |
| EP | 3510725 | A1 | 7/2019 |
| WO | 2018/049314 | A1 | 3/2018 |

OTHER PUBLICATIONS

IEEE 802.3cg-2019. Amendment 5: Physical Layers Specifications and Management Parameters for 10 Mb/s Operation (Year: 2019).*

AEM blog—PoE and PoDL Standards Explained. Retrieved from https://blog.aem-test.com/poe-and-podl-standards-explained (Year: 2019).*

Industrial Ethernet Book, Enhancing industrial network infrastructure performance. Retrieved from https://iebmedia.com/technology/industrial-ethernet/enhancing-industrial-network-infrastructure-performance/ (Year: 2018).*

Authorized Officer: Agnes Wittmann-Regis, English translation of International Preliminary Report on Patentability issued in PCT application No. PCT/EP2021/051979, Jul. 28, 2022, 6 pp.

Office Action issued in Chinese Patent Application No. 202180011910.8 on Jul. 15, 2023 and English Translation thereof.

"IEEE Standard for Ethernet, Amendment 8: Physical Layer and Management Parameters for Power over Data Lines (PoDL) of Single Balanced Twisted-Pair Ethernet", IEEE Standards Association, IEEE Computer Society, Dec. 7, 2016, IEEE Std 802.3bu-2016, 78 pp., Jan. 5, 2021.

Authorized Officer: Mircescu, Alexander, International Search Report and Written Opinion issued in PCT application No. PCT/EP2021/051979, Apr. 22, 2021, 8 pp.

Examiner: Dr. Vlado Altmann, Office Action issued in German patent application No. 102020102239.5, Jan. 7, 2021, 18 pp. w/ translation.

Examiner: Mircescu, Alexander, Search Report issued in Luxembourg patent application No. LU101627, Oct. 5, 2020, 15 pp. w/ translation.

* cited by examiner

SPE-BASED DEVICE ADAPTER FOR CONNECTING A NON-ETHERNET-COMPATIBLE FIELD DEVICE TO AN ETHERNET-BASED PROCESS CONTROL SYSTEM

FIELD

The invention relates to an SPE-based device adapter for connecting a non-Ethernet-capable field device to an Ethernet-based process control system which may in particular form part of an industrial automation system.

BACKGROUND

A process control system includes field devices such as sensors and actuators which communicate with a higher-level control device via a communication network. By now, Ethernet technology has been gaining more and more acceptance in industrial automation technology. So far, four-wire or eight-wire Ethernet cables have been used in communication networks to connect field devices to a higher-level Ethernet-capable control device. If non-Ethernet-capable field devices, such as, e.g., IO-Link-based field devices, are to be connected to a four-wire or eight-wire Ethernet cable, appropriate IO modules are used, which allow to connect non-Ethernet-capable field devices to the four-wire or eight-wire cable. More recently, it has become increasingly apparent in automation technology that single-pair Ethernet (SPE) technology will be employed, at least at the network level, according to which network subscribers are wired to one another via two-wire Ethernet cables. The SPE technology not only enables data exchange, but also power supply for the connected network subscribers, which is also known as Power over Dataline (PoDL).

SUMMARY

The present invention is based on the object to provide an SPE-based device adapter which allows to connect a non-Ethernet-capable field device to an Ethernet-based process control system via a two-wire Ethernet cable in a simple and cost-effective manner.

The above stated technical object is achieved by the features described herein.

Accordingly, an SPE-based device adapter is provided for connecting a non-Ethernet-capable field device to an Ethernet-based process control system, the SPE-based device adapter having the following features:

- a first SPE-based communication interface adapted for receiving and transmitting Ethernet data frames via a two-wire Ethernet cable;
- a second communication interface adapted for receiving and transmitting data according to a first communication protocol from and to a non-Ethernet-capable field device, with the first communication protocol not being an Ethernet-based communication protocol;
- a first conversion unit which is adapted for converting data received via the second communication interface into Ethernet data frames for transmission via the first SPE-based communication interface, and for converting Ethernet data frames received via the first SPE-based communication interface into data for transmission over the second communication interface according to the first communication protocol.

It should be noted that the SPE-based device adapter may in particular be in the form of a plug-in connector. In the context of the invention, the feature "Ethernet data frame" can be understood to mean, for example, that data can be transmitted according to an Ethernet communication protocol in Ethernet data frames via an SPE-based communication interface and a two-wire Ethernet cable.

In order to obtain a compact and flexible SPE-based device adapter, a third communication interface can be provided, which is adapted for receiving and transmitting data according to a second communication protocol from and to a non-Ethernet-capable field device. Again, the second communication protocol is not an Ethernet communication protocol. Furthermore, the second communication protocol is different from the first communication protocol. In addition, a second conversion unit is provided, which is adapted for converting data received via the third communication interface into Ethernet data frames for transmission via the first SPE-based communication interface, and for converting Ethernet data frames received via the first SPE-based communication interface into data for transmission via the third communication interface according to the second communication protocol. Furthermore, a control and/or evaluation device may be provided, which is adapted for detecting whether a non-Ethernet-capable field device is connected to the second or third communication interface. It is also adapted to connect the first or second conversion unit to the first SPE-based communication interface in response thereto.

According to an alternative embodiment, the SPE-based device adapter may have a third communication interface which is adapted for receiving and transmitting data according to a second communication protocol from and to a non-Ethernet-capable field device. The second communication protocol is not an Ethernet communication protocol and moreover differs from the first communication protocol. In addition, a fourth SPE-based communication interface is provided, which is adapted for receiving and transmitting Ethernet data frames via a two-wire Ethernet cable. Furthermore, a second conversion unit is provided, which is adapted for converting data received via the third communication interface into Ethernet data frames for transmission via the fourth SPE-based communication interface, and for converting Ethernet data frames received via the fourth SPE-based communication interface into data for transmission via the third communication interface according to the second communication protocol.

It should be noted here, that the first and second conversion units preferably are communication protocol conversion units which convert data according to an Ethernet communication protocol, i.e. Ethernet data frames, into data according to the first and/or second communication protocols, and vice versa.

Preferably, the second communication interface can be any of an IO-Link, HART, CAN, Profibus, RS-232, or RS-485 interface, and the first communication protocol can be any of an IO-Link, HART, CAN, Profibus, RS-232, or RS-485 communication protocol. However, any other non-Ethernet-based communication interfaces and non-Ethernet-based communication protocols are possible. Furthermore, the second communication interface may be any of a digital, analog, or optical communication interface.

Similarly, the third communication interface can be any of an IO-Link, HART, CAN, Profibus, RS-232, or RS-485 interface, and the second communication protocol can be any of an IO-Link, HART, CAN, Profibus, RS-232, or RS-485 communication protocol, with the second and third communication interfaces of the SPE-based device adapter being different from one another, as are the applied first and second communication protocols.

For powering the electronic components of the SPE-based device adapter, in particular the conversion units and the evaluation and/or control device, it is possible to employ the so-called Power over Data Line (PoDL) technology, in which case the SPE-based device adapter will be powered via a two-wire Ethernet cable, for example by enabling to connect, to the two-wire Ethernet cable, a network coupling element or a control device that provides the respective power.

The above-stated technical object is also achieved by the features described herein.

Accordingly, an Ethernet-based process control system is provided, comprising the following features:

- an SPE-based device adapter as described herein, to which a non-Ethernet-capable field device is connected;
- a network coupling element, comprising:
  - a port that is adapted for connecting a four-wire or eight-wire Ethernet cable;
  - at least one SPE-based port that is adapted for connecting a two-wire Ethernet cable; and
  - a conversion unit that is adapted for converting data arriving at the at least one SPE-based port into data for transmission via the port, and for converting data arriving at the port into data for transmission via the at least one SPE-based port; and
- a higher-level control device that can be connected to the network coupling element via a four-wire or eight-wire Ethernet cable,
- wherein the network coupling element is connectable to the SPE-based device adapter via a two-wire Ethernet cable.

BRIEF DESCRIPTION OF THE DRAWINGS

The invention will now be explained in more detail by way of an exemplary embodiment in conjunction with the accompanying drawings, wherein.

DETAILED DESCRIPTION

Figure 1:
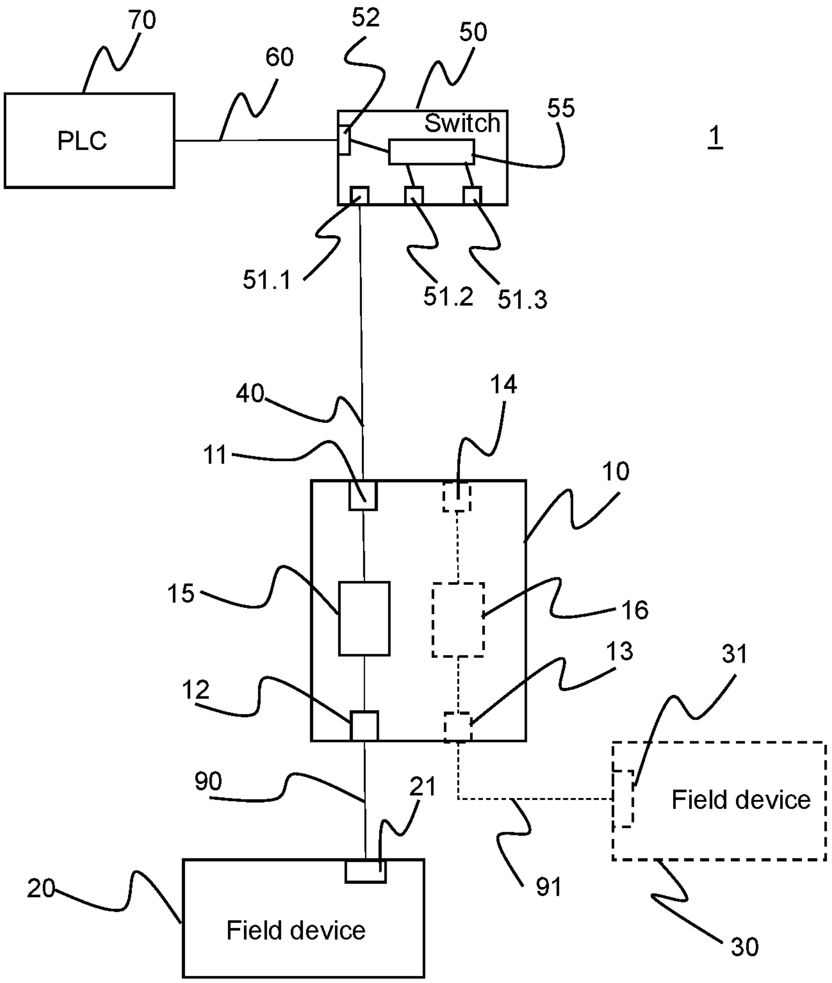
FIG. 1 shows an exemplary process control system including an SPE-based device adapter according to the invention.

FIG. 1 shows a single-pair Ethernet-based device adapter 10, referred to as an SPE device adapter for short, which allows to connect at least one non-Ethernet-capable field device 20 to an Ethernet-based process control system 1. The exemplary SPE-based device adapter 10 is preferably in the form of a plug-in connector which has a first SPE-based communication interface 11 that is adapted for receiving and transmitting Ethernet data frames via a two-wire Ethernet cable 40. It should be noted that an Ethernet data frame is based on an Ethernet communication protocol. The SPE-based device adapter 10 can preferably be connected to a network coupling element 50 via the two-wire Ethernet cable 40, i.e. an SPE cable. The network coupling element 50 is preferably a layer 2 Ethernet switch which may have a plurality of SPE-based ports 51.1-51.*n*. In the illustrated example, the two-wire Ethernet cable 40 is connected to SPE-based port 51.1. The network coupling element 50 furthermore has an Ethernet-based interface 52 to which either a four-wire or an eight-wire Ethernet cable 60 can be connected. In the present example it is assumed that the cable 60 is an eight-wire Ethernet cable. The eight-wire cable 60 can be used to connect the network coupling element 50 to a higher-level control device 70, which is an Ethernet-capable programmable logic controller (PLC), for example. If the higher-level control device 70 has an SPE-based interface, the SPE-based device adapter 10 may as well be directly connected to the higher-level control device 70 via the two-wire Ethernet cable 40. The exemplary network coupling element 50 preferably comprises a conversion unit 55 which is adapted for converting data arriving at the SPE-based port 51.1, for example, into data for transmission via the eight-wire Ethernet port 52, and vice versa.

Advantageously, the Ethernet-based process control system 1 may comprise the higher-level control device 70, the SPE-based device adapter 10 or 80, the network coupling element 50, and non-Ethernet-capable field devices 20, 30.

The SPE-based device adapter 10 has a second communication interface 12 which is adapted for receiving and transmitting data from and to the non-Ethernet-capable field device 20 according to a first communication protocol. The non-Ethernet-capable field device 20 can be a sensor and an actuator having a communication interface 21, for example. The second communication interface 12 and communication interface 21 of the non-Ethernet-capable field device 20 each support a first communication protocol that is not an Ethernet-based communication protocol. For example, the second communication interface 12 and the communication interface 21 of field device 20 may be any of an IO-Link, HART, CAN, Profibus, RS-232, or RS-485 interface. In the present case, the second communication interface 12 and the interface 21 of field device 20 are an IO-Link interface by way of example, which are interconnected via a corresponding cable 90 in the illustrated example. Thus, the non-Ethernet-capable field device 20 is a field device which uses the IO-Link communication protocol. In order to be able to connect the non-Ethernet-capable field device 20 to the Ethernet-based process control system 1, the SPE-based device adapter includes a conversion unit 15 which preferably is in the form of a communication protocol converter. Accordingly, the conversion unit 15 is adapted for converting data received from the field device 20 via the second communication interface 12 which is implemented as an IO-Link interface, for example, into Ethernet data frames for transmission via the first SPE-based communication interface 11, and to convert Ethernet data frames received via the first SPE-based communication interface 11 from the network coupling element 50 or from the higher-level control device 70 into data for transmission via the second communication interface 12 according to the first communication protocol, here the IO-Link communication protocol.

In order to expand the field of application and the flexibility of the SPE-based device adapter 10 and to achieve scalability, a third communication interface 13 can be provided, which is adapted for receiving and transmitting data according to a second communication protocol from and to a non-Ethernet-capable field device 30, the second communication protocol not being an Ethernet communication protocol, and with the first and second communication protocols being different from each other. For example, the third communication interface may support the Profibus communication protocol as the second communication protocol, in which case the non-Ethernet-capable field device 30 is in the form of a Profibus-capable field device 30 having a Profibus-based communication interface 31. Field device 30 can be connected to the third communication interface 13 via the Profibus-based communication interface 31 using a Profibus-based connection cable 91. The SPE-based device adapter 10 may furthermore have a fourth SPE-based communication interface 14. In addition, a second conversion unit may be implemented in the SPE-based device adapter 10, which is adapted for converting data received from the field device 30 via the third communication interface into Ethernet data frames for transmission via the fourth SPE-based communication interface 14, and for converting Ethernet data frames received via the fourth SPE-based communication interface 14 into data for transmission via the third communication interface 13 according to the second communication protocol, i.e. the Profibus communication protocol in the present example.

If, for example, the device adapter 10 comprises the fourth SPE-based communication interface, the second conversion unit 16 and the third communication interface 13, in practice, only one field device, e.g. field device 20 or field device 30, will preferably be connected to the Ethernet-based process control system 1 or to the network coupling element 50 via the device adapter 10, for example via the two-wire Ethernet cable 40. However, it is also conceivable to simultaneously connect both field devices 20 and 30 to the network coupling element 50 via the SPE-based device adapter 10, for example. For this purpose, a further two-wire Ethernet cable (not shown) can be used to connect the fourth SPE-based communication interface 14 to the SPE-based port 51.2 of network coupling element 50, for example.

Figure 2:
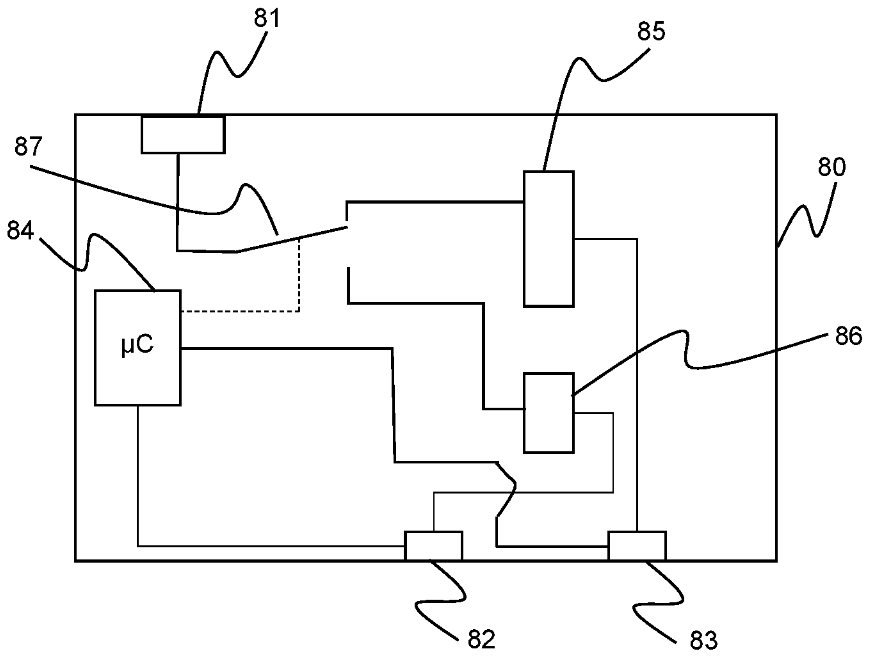
FIG. 2 shows an alternative SPE-based device adapter.

FIG. 2 shows an alternative SPE-based device adapter 80 which, similar to SPE device adapter 10, can have the following features: a first SPE-based communication interface 81 which is adapted for receiving and transmitting Ethernet data frames via a two-wire Ethernet cable, for example cable 40; a communication interface 82 which is adapted for receiving and transmitting data according to a first communication protocol from and to a non-Ethernet-capable field device, for example field device 20, with the first communication protocol not being an Ethernet-based communication protocol; a first conversion unit 86 which is adapted for converting data received via the second communication interface 82 into Ethernet data frames for transmission via the first SPE-based communication interface 81, and for converting Ethernet data frames received via the first SPE-based communication interface 81 into data for transmission via the second communication interface 82 according to the first communication protocol. In the present example, the first communication protocol may again be the IO-Link communication protocol. In the exemplary SPE-based device adapter 80, the second communication interface 82 will thus be adapted to receive and transmit data according to the IO-Link communication protocol.

According to an advantageous embodiment, the SPE-based device adapter 80 can also be used to connect at least two different non-Ethernet-capable field devices to the Ethernet-based process control system 1.

For this purpose, the SPE-based device adapter 80 furthermore has a third communication interface 83 which is adapted for receiving and transmitting data according to a second communication protocol from and to a non-Ethernet-capable field device, for example field device 30. The second communication protocol may be the Profibus communication protocol, for example, in which case the field device 30 can be connected to the third communication interface 83 via connection cable 91, for example. The second communication protocol is not an Ethernet communication protocol and is different from the first communication protocol. The SPE-based device adapter 80 may comprise a second conversion unit 85 which is adapted for converting data received via the third communication interface 83 into Ethernet data frames for transmission via the first SPE-based communication interface 81, and for converting Ethernet data frames received via the first SPE-based communication interface into data for transmission over the third communication interface 83 according to the second communication protocol. Thus, the SPE-based device adapter 80 acts as a kind of gateway, i.e. as a protocol converter. Furthermore, the SPE-based device adapter 80 may comprise a control and/or evaluation device 84, for example in the form of a microcontroller. The control and/or evaluation device 84 is adapted to detect whether a non-Ethernet-capable field device is connected to the second communication interface 82 or to the third communication interface. The control and/or evaluation device 84 is furthermore adapted to connect the first conversion unit 86 or the second conversion unit 85 to the first SPE-based communication interface 81, depending on whether a non-Ethernet-capable field device is connected to the second or to the third communication interface. For this purpose, the control and/or evaluation device 84 may drive a switching element 87 accordingly.

For powering in particular the conversion unit 15 and, if provided, the conversion unit 16, it is possible to use what is known as the Power over Data Line technology. For example, if the network coupling element 50 has its own power supply unit, PoDL technology makes it possible to power the SPE-based device adapter 10 via the two-wire Ethernet cable 40. Similarly, the SPE-based device adapter 80 and in particular the control and/or evaluation device 84 and the two conversion units 85 and 86 can also be powered via the power supply unit of the network coupling element 50, for example.

Some exemplary aspects of the invention are summarized again below.

Accordingly, a process control system 1 is provided, which is shown in FIG. 1 by way of example and which can have the following features:

- an SPE-based device adapter 10 or 80 as discussed above by way of example, to which a non-Ethernet-capable field device 20 and/or 30 is connected;
- a network coupling element 50 which has:
  - a port 52, adapted for connecting a four-wire or eight-wire Ethernet cable 60;
  - at least one SPE-based port 51.1-51.*n*, adapted for connecting a two-wire Ethernet cable 40; and
  - a conversion unit which is adapted for converting data arriving at the at least one SPE-based port 51.1-51.*n* into data for transmission via port 52, and for converting data arriving at port 52 into data for transmission via the at least one SPE-based port 51.1-51.*n*; and
- a higher-level control device 70 that can be connected to the network coupling element 50 via a four-wire or eight-wire Ethernet cable 60;
- wherein the network coupling element 50 can be connected to the SPE-based device adapter 10, 80 via a two-wire Ethernet cable 40.

LIST OF REFERENCE NUMERALS

1 Process control system
10 SPE-based device adapter
11 First SPE-based communication interface
12 Second communication interface
13 Third communication interface
14 Fourth SPE-based communication interface

15 First conversion unit, in particular for communication protocol conversion,

16 Second conversion unit, in particular for communication protocol conversion

20 Non-Ethernet-capable field device, in particular sensor or actuator

21 Communication interface

30 Non-Ethernet-capable field device, in particular sensor or actuator

31 Communication interface

40 Two-wire Ethernet cable

50 Network coupling element, in particular layer 2 Ethernet switch

51.1-*n* SPE-based port

52 Port for connecting a four-wire or eight-wire Ethernet cable

55 Conversion unit

60 Four-wire or eight-wire Ethernet cable

70 Higher-level control device, e.g. Ethernet-capable PLC

80 SPE-based device adapter

81 First SPE-based communication interface

82 Second communication interface

83 Third communication interface

84 Evaluation and/or control device, e.g. microcontroller

85 First conversion unit, in particular for communication protocol conversion,

86 Second conversion unit, in particular for communication protocol conversion

87 Controllable switching element

90 Connection cable

91 Connection cable

The invention claimed is:

1. An SPE-based device adapter for connecting at least one non-Ethernet-capable field device to an Ethernet-based process control system, comprising:

a first SPE-based communication interface configured to receive and transmit Ethernet data frames via a two-wire Ethernet cable;

a second communication interface configured to receive and transmit data according to a first communication protocol from and to the at least one non-Ethernet-capable field device, wherein the first communication protocol is not an Ethernet-based communication protocol;

a first conversion unit configured to convert data received via the second communication interface into Ethernet data frames for transmission via the first SPE-based communication interface, and to convert Ethernet data frames received via the first SPE-based communication interface into data for transmission via the second communication interface according to the first communication protocol;

a third communication interface configured to receive and transmit data according to a second communication protocol from and to the at least one non-Ethernet-capable field device, wherein the second communication protocol is not an Ethernet-communication protocol and the first and second communication protocols are different;

a second conversion unit configured to convert data received via the third communication interface into Ethernet data frames for transmission via the first SPE-based communication interface and to convert Ethernet data frames received via the first SPE-based communication interface into data for transmission via the third communication interface according to the second communication protocol; and a control and/or evaluation device configured to detect whether the at least one non-Ethernet-capable field device is connected to the second or third communication interface and to connect the first or second conversion unit to the first SPE-based communication interface in response thereto by driving a switching element.

2. The SPE-based device adapter of claim 1, wherein the second communication interface is an interface selected from the group consisting of IO-Link, HART, CAN, Profibus, RS-232, and RS-485.

3. The SPE-based device adapter of claim 1, wherein:

the second communication interface is an IO-Link-, HART-, CAN-, Profibus-, RS-232-or RS-485-interface;

the third communication interface is an IO-Link-, HART-, CAN-, Profibus-, RS-232- or RS-485-interface; and the second and third communication interfaces are different.

4. The SPE-based device adapter of claim 1, wherein a power supply of the SPE-based device adapter is implemented via the two-wire Ethernet cable that is connectable to the first SPE-based communication interface.

5. An Ethernet-based process control system, comprising:

an SPE-based device adapter to which at least one non-Ethernet-capable field device is connected, the SPE-based device adapter comprising:

a first SPE-based communication interface configured to receive and transmit Ethernet data frames via a two-wire Ethernet cable;

a second communication interface configured to receive and transmit data according to a first communication protocol from and to the at least one non-Ethernet-capable field device, wherein the first communication protocol is not an Ethernet-based communication protocol;

a first conversion unit configured to convert data received via the second communication interface into Ethernet data frames for transmission via the first SPE-based communication interface, and to convert Ethernet data frames received via the first SPE-based communication interface into data for transmission via the second communication interface according to the first communication protocol;

a third communication interface configured to receive and transmit data according to a second communication protocol from and to the at least one non-Ethernet-capable field device, wherein the second communication protocol is not an Ethernet-communication protocol and the first and second communication protocols are different;

a second conversion unit configured to convert data received via the third communication interface into Ethernet data frames for transmission via the first SPE-based communication interface and to convert Ethernet data frames received via the first SPE-based communication interface into data for transmission via the third communication interface according to the second communication protocol; and a control and/or evaluation device configured to detect whether the at least one non-Ethernet-capable field device is connected to the second or third communication interface and to connect the first or second conversion unit to the first SPE-based communication interface in response thereto by driving a switching element, a network coupling element, comprising:

a port configured to connect a four-wire or eight-wire Ethernet cable;

at least one SPE-based port configured to connect the two-wire Ethernet cable; and a conversion unit configured to convert data arriving at the at least one SPE-based port into data for transmission via the at least one SPE-based port; and a higher-level control device connectable to the network coupling element via the four-wire or eight-wire Ethernet cable, wherein the network coupling element is connectable to the SPE-based device adapter via the two-wire Ethernet cable.

6. The Ethernet-based process control system of claim 5, wherein the network coupling element is a layer 2 Ethernet switch.

* * * * *